Figure 1:
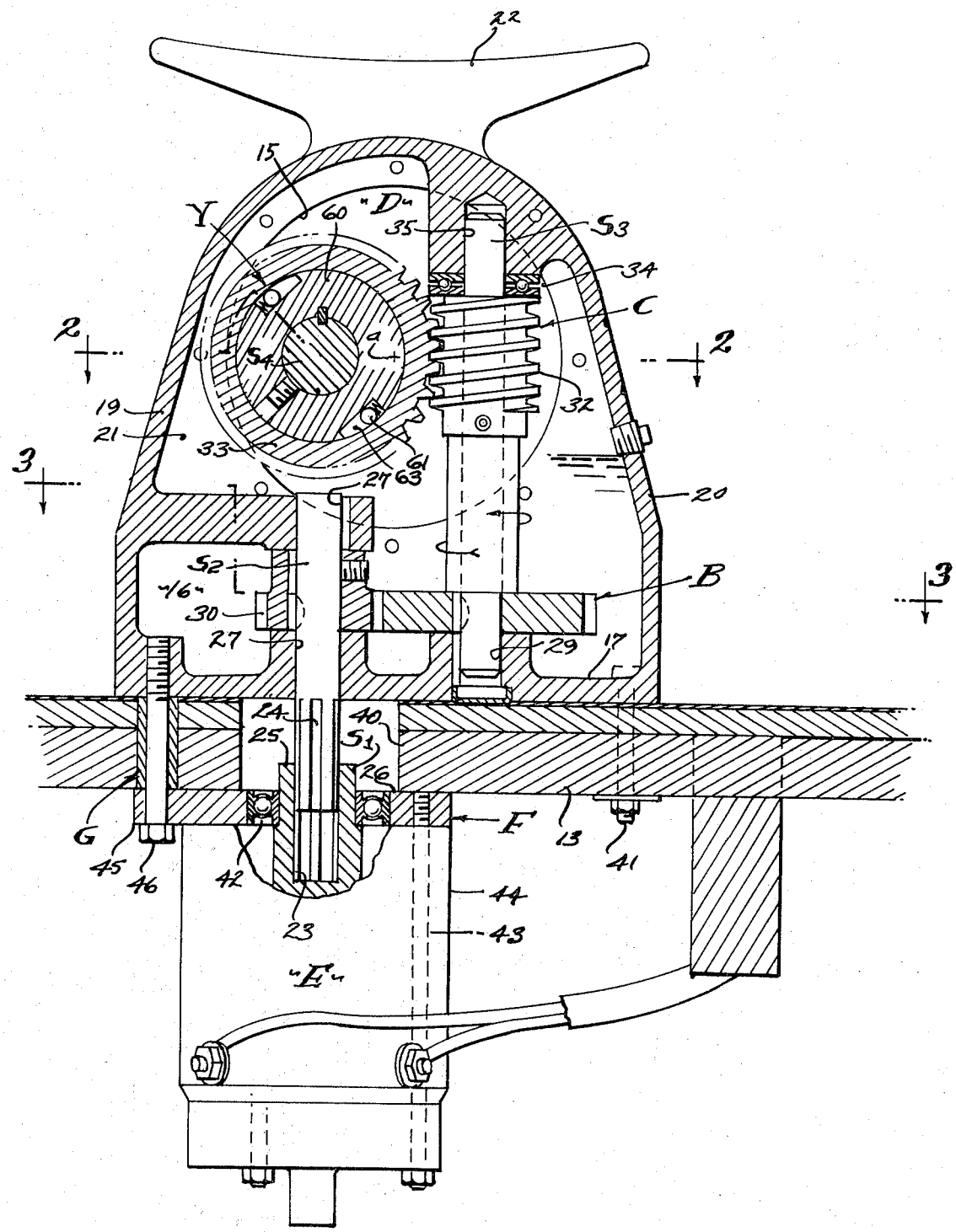

United States Patent [19]

Sprague

[11] 3,873,069
[45] Mar. 25, 1975

[54] BOAT DECK WINDLASS WITH POWERED-MANUAL DRIVE

[76] Inventor: Stephen A. Sprague, 420 Linnie Canal, Marina Del Rey, Calif. 90291

[22] Filed: Feb. 28, 1973

[21] Appl. No.: 336,607

[52] U.S. Cl. ............... 254/187 R, 74/625, 74/661, 192/48.92, 192/95, 254/150 R
[51] Int. Cl. ............................................. B66d 1/14
[58] Field of Search ........... 254/150 R, 187 R, 181, 254/182; 192/48.92, 95, 47; 74/625, 661

[56] References Cited
UNITED STATES PATENTS

| | | | |
|---|---|---|---|
| 2,435,353 | 2/1948 | Hite | 254/187 R |
| 2,826,096 | 3/1958 | Hoge | 74/661 |
| 3,062,344 | 11/1962 | Kachinskas | 74/625 |
| 3,262,526 | 7/1966 | Kramer | 192/48.92 X |
| 3,290,963 | 12/1966 | Oldfield et al. | 74/661 X |
| 3,369,638 | 2/1968 | Hunt et al. | 74/625 |
| 3,383,948 | 5/1968 | Palmer et al. | 74/625 |
| 3,658,299 | 4/1972 | Sprague | 254/150 R |
| 3,709,466 | 1/1973 | Dowrelio | 254/187 R |

*Primary Examiner*—James B. Marbert
*Assistant Examiner*—Jeffrey V. Nase

[57] ABSTRACT

A windlass for boat decks and the like wherein one of the hauling elements is clutch controlled for manually assistable powered operation. The hauling element, a capstan or cathead or the like, is carried by a drive shaft that is driven from a prime mover by means of an overrunning clutch, there being a manually operable overrunning clutch drive combined therewith for assisting operation. A feature is the common drive direction of said overrunning clutches and the direction of rotation of the powered output transmission means in combination therewith.

14 Claims, 6 Drawing Figures

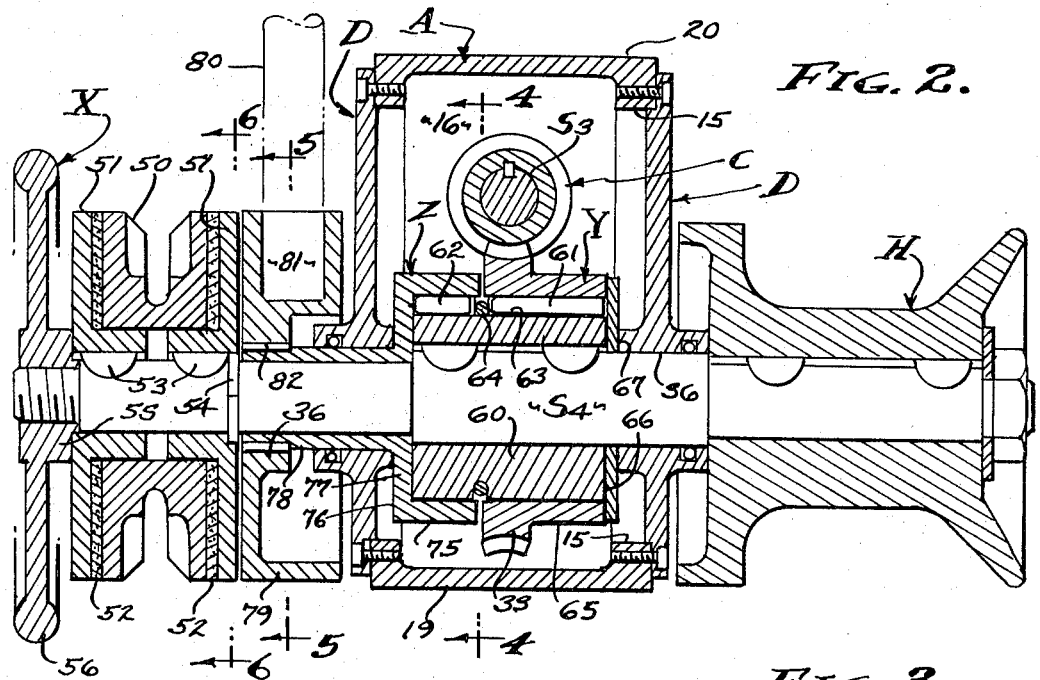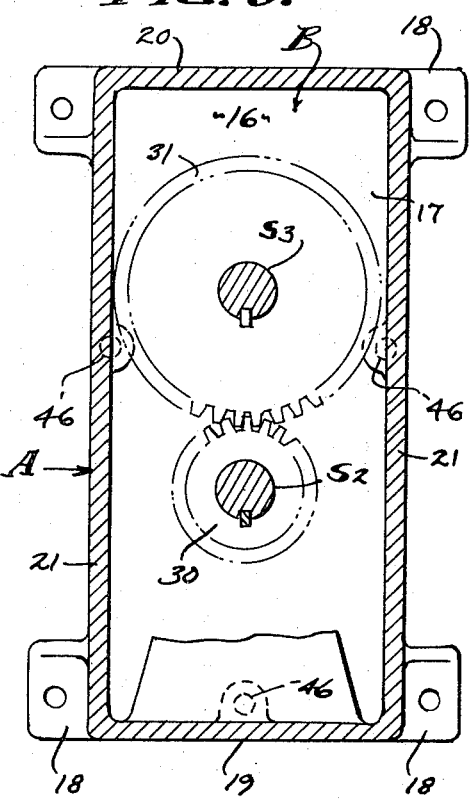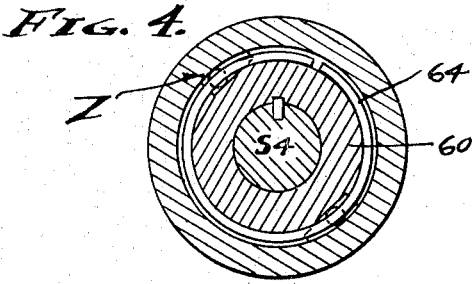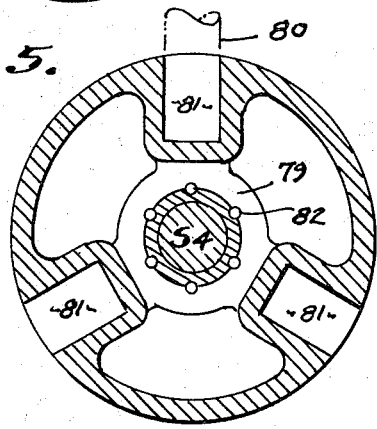

BOAT DECK WINDLASS WITH POWERED-MANUAL DRIVE

Reference is made to my U.S. Pat. No. 3,658,299 issued Apr. 25, 1972, and entitled BOAT DECK WINDLASS, upon which this invention is an improvement. The windlass involved is usually characterized by direct worm and wheel gearing with its consequent inability to release the cathead and/or capstan. Firstly, it is desirable to enable release of said hauling elements, and particularly the cathead, and it is an object therefore, to provide releasable driving engagement to a line hauling element in a windlass having direct self-locking gearing and release from a continuously operable prime mover therefor. Secondly, since a prime mover power source is subject to failure, it is an object to provide a manual assist having leverage capability without hindering normal operation of the prime mover.

A windlass of the type under consideration is provided with a live output shaft, having a capstan at one end and a cathead at the other end. The capstan is by its very nature releasable through the employment of line handling techniques; however the cathead is by its very nature a non-slip device and positive acting when engaged with a chain. Therefore, it is an object of this invention to provide for releasable driving engagement of the cathead while the capstan remains continuously driven by the live output shaft of the windlass.

An object of this invention is to provide for automatic drive of the live output shaft of a windlass on demand from a powered prime mover. With the present invention, the live output shaft is driven by means of a motorized overrunning clutch, and all of which revolves in a direction for hauling.

Another object of this invention is to provide for automatic drive of the live output shaft of a windlass on demand from a manually operable element. With the present invention, the live output shaft is driven by means of a manually operable overrunning clutch, and all of which revolves in a direction for hauling.

It is still another object of this invention to provide a unique windlass of the character thus far referred to wherein the two aforementioned overrunning clutches drive uni-directionally and are both free wheeling in the opposite direction of rotation, and characterized by a common releasable drive element. With the present invention, the two overrunning clutches are complementary and provide for selective manual assist of the prime mover drive as and when circumstances require.

It is a further object of this invention to advantageously combine a self-locking gear train with two overrunning clutches, one driven by a prime mover and the other that is manually operable in order to assist operation of the windlass to haul by revolving a cathead or the like. With the present invention the two overrunning clutches and self-locking gear element are combined in one compact unit.

SUMMARY OF INVENTION:

In accordance with the improvements of the present invention, I provide a clutch unit X that releasably engages the cathead of the windlass in response to a manually operable element that revolves therewith, and two overrunnning clutches Y and Z that are incorporated as a unit in the nature of a hub combined with the driven element of a self-locking gear transmission C. The elements X, Y, Z and C are advantageously employed within the housing confines of a windlass of the type which will first be described.

DRAWINGS:

The various objects and features of this invention will be fully understood from the following detailed description of the typical preferred form and application thereof, throughout which description reference is made to the accompanying drawings, in which:

FIG. 1 is a longitudinal sectional view taken through the windlass and supporting deck structure.

FIGS. 2 and 3 are transverse sectional views taken as indicated by lines 2—2 and 3—3 on FIG. 1.

FIGS. 4, 5 and 6 are detailed sectional views taken as indicated by lines 4—4, 5—5 and 6—6 on FIG. 2.

PREFERRED EMBODIMENT

The boat deck windlass is illustrated throughout the drawings in its preferred form and comprises, generally, above deck elements involving the windlass per se and below deck elements involving the prime mover and its directly associated elements. Involved in the above deck windlass elements is a frame A, input transmission means B, output transmission means C, and bearing plates D. The frame A is the exposed structure that is permanently mounted to the deck, while the transmission means B and C are contained within the frame with access for installation through end openings in the frame which are closed by the bearing plates D. Involved in the below deck prime mover elements is a motor E having an end mount F, and spacers G. The prime mover is protectively housed below deck and is mounted on the windlass frame A, independent of the deck structure. As shown in FIG. 2, the windlass drives the usual line hauling elements, for example a capstan H and a cathead K. It is to be understood that the line hauling elements can vary as circumstances require, a typically desirable configuration being illustrated.

Referring now to the above deck elements, the frame A is a housing that accommodates and completely encloses the transmission means B and C. The usual deck 10 is horizontally disposed and the output shaft S4 is journaled by the bearing plates D on an axis parallel to and spaced above the plane of the deck. As shown and as will be described the bearing plates D form enclosures for the frame A and cover the end openings 15 in the frame and through which the gearing B and C and shafting S2 and S3 thereof is inserted into a chamber 16 within the frame. The frame is comprised of a flat base 17 with mounting ears 18 by which it is fastened to the deck 10, and from which there are upstanding walls, there being front and rear walls 19 and 20 and spaced and parallel side walls 21. The top of the frame is rounded in which case the walls 19 and 20 merge on a common radius. The lower portion of the frame forms a basin or sump within which the input transmission means B operates, while the upper portion of the frame forms a head within which the output transmission means C operates. Said basin contains the oil for lubrication as indicated in FIG. 1, there being a plug in wall 20 at a fill level establishing the quantity required while said head is coextensive with the diameter of the bearing plates D and which establishes the configuration of the access openings 15. Thus, the frame A is divided into basin and head portions, the openings 15 being turned about a locating center a from which the axes of the shafts S2, S3 and S4 are located. As shown, the top of the frame A, the head portion, carries a bit 22 to which a line can be tied.

The input transmission means B comprises spaced driving shafts S2 and S3, the former entering the frame A from the exterior thereof and the latter operating within the chamber 16 to drive the output shaft S4. It is feasible to angularly relate the shafts S2 and S3 to the axis a and to shaft S4 and to the plane of deck 10 and to each other; a most practical symmetrical arrangement being shown wherein the axes of shaft S2 and S3 are spaced and parallel and vertically disposed normal to the plane of deck 10 and in a plane midway between the bearing plates D. It is also preferred that the shafts S1 and S3 depend beneath the axis a or from the output shaft S4, for compactness. In accordance with the invention, the shafts S1 and S2 are coaxial and the first is driveably coupled to the second, preferably through a telescoped and splined engagement. It is a matter of choice which is the male or female shaft member, and in the preferred form the shaft S1 is the female having a splined socket 23 and the shaft S2 is the male having a projecting and splined stub 24. Both the socket 23 and stub 24 are of substantial axial extent so as to accommodate variations in the thickness of deck 10, and the shaft S1 terminating in an end 25 spaced upwardly from the face 26 of the mount F.

In accordance with the invention, the input transmission means B extends from shaft S2 to shaft S3 to drive the same. In the preferred form spur gears 30 and 31 are employed having a ratio, for example, of one to two, whereby the shaft S3 revolves at half the speed of shaft S2. Accordingly, the shaft S2 extends into the frame A through a bearing 27, there being a seal 28 to contain lubricant within the housing chamber 16. There is also a bearing 23' spaced above the base 17, integral with and supported by and/or between the upstanding walls of the frame. The shaft S3 is installed into the frame A through a bearing 29, and which extends into the chamber 16 and carries the driven gear 31 meshed with the pinion gear 30. Said gears 30 and 31 are keyed to the shafts S2 and S3, as shown. In practice, the bearing 29 opening is closed by a plug pressed therein.

The output transmission means C comprises spaced and right angularly related driving shaft S3 and output shaft S4, the former operating within the chamber 16 and the latter extending through the chamber and projecting from the sides 20 of the frame A. In accordance with the invention, the output transmission means C is a worm 32 and wheel 33 transmission, and in the preferred form employs a speed reduction ratio of thirty to one and which has an interlocking action with respect to revolvement of shaft S4, the worm 32 being driveably carried by the shaft S3. Thus in the example shown, the gear reduction from shafts S1 and S2 to shaft S4 is sixty to one, and it will be observed that when pulling rearwardly at the top periphery of the capstan H or cathead K the worm 32 bears downward on the periphery of the wheel 33 and is consequently thrust axially upward. The said upward thrust is borne by an antifriction axial thrust bearing 34 with the upper end of shaft S3 is journaled in a bearing 35 aligned with the bearing 29. The bearings 23, 23', 29 and 35 are integral with the frame A and are readily machined in proper position and alignment with respect to the axis a by means of a jig or fixture fitted into the turned openings 15.

The bearing plates D are provided to close the turned openings 15 and are rotatably positioned therein so as to maintain alignment of the output shaft S4. In accordance with the invention, the two plates D at opposite sides 21 of the frame A are centered through bossed engagement with said turned openings and are provided with bearings 36 positioned eccentrically therein as required by the displacement of the axis of shaft S3 from the axis of the shaft S4. In the case illustrated, the eccentric displacement is horizontally forward of axis a with the shaft S4 extending transversely through the chamber 16 and projecting through the bearings 36 to extend internally of the frame A. The bearings 36 are bossed inwardly and have opposed axial thrust faces that hold the wheel 33 positioned in alignment with the worm 32. The opposite ends of the shaft S4 driveably carry the capstan H and cathead K respectively and as illustrated in FIG. 2.

Referring now to the below deck elements, the prime mover or motor E is provided for mounted attachment to the frame A so as to operate therewith as a unit. As shown in FIG. 1 the frame A and motor E are separable, with the spacers G to be placed therebetween. Although deck structure varies widely, it suffices to recognize that a deck has variable thickness, and for example the decking can be one-half inch plywood 11 with an impervious skin 12, and there can be an underlying blocking 13; the total structural thickness varying depending upon the structure employed in each instance. Accordingly, an opening 40 is bored through the deck 10 so as to amply surround the projecting stub 24 of shaft S2, and the frame A is fastened to the deck by bolts 41 passing through the mounting ears 18. As shown, the stub 24 of shaft S2 extends through the opening 40 and may or may not project from the lower plane of the blocking 13.

The prime mover or motor E is especially prepared for cooperative coupled engagement with the above deck elements hereinabove described. Since the externally splined stub 24 of shaft S2 is of sizeable diameter, the internally splined socket 23 is also of sizeable diameter and extends into the shaft S1. In practice, the end 25 of shaft S1 is spaced a short distance above the face 26 of the mount F, in which case the socket 23 extends well below said face, thereby assuring telescoped engagement and providing a wide range of adjustment.

In accordance with the invention, the motor E is provided with a unique rotor shaft S1 that is journaled in a sealed anti-friction bearing 42 centered in the mount F. The mount F is a plate that is fastened to the motor frame 44 as by means of tie-rods 43, there being lateral flanges 45 projecting from the mount to pass mounting bolts 46 that extend through the deck structure and to threadedly engage in the frame A (there being three such bolts 46 indicated in FIG. 3). In carrying out the invention, the above described installation is made with the use of tubular spacers G, cut to equal lengths at least the same or greater than the deck thickness. The opposite terminal ends 47 of the spacers are normal to the axes thereof, and being spaced and parallel said ends provide for fixed spaced attachment of the motor E onto the frame A.

In accordance with the invention, I provide the clutch unit X that releasably connects the cathead to the live output shaft S4, enabling the cathead to be free so as to revolve while permitting the capstan to be continuously driven by shaft S4. It will be observed that the clutch unit X drives directly from the shaft S4 and involves a free running cathead 50 journaled on and between opposed drive flanges 51. As shown, the cathead 50 has opposite drive faces in parallel planes normal to the axis of rotation and there is a disc 52 of friction lining floating between each face and opposed flange respectively. In each instance the flanges have hubs that slide axially upon the extended end portion of shaft S4 and each hub is keyed to the shaft at 53 to rotate therewith. The innermost flange 51 is axially positioned by means of a split shoulder ring 54 (see FIG. 6) so as to bear outwardly, while the outermost flange 51 is yieldingly urged axially into pressured engagement against the friction discs 52 by means of a nut 55 operated by a hand wheel 56. The nut 55 is threaded onto the projecting end of shaft S4 and rotates with the shaft and cathead 50 and elements of clutch X. It will be apparent that the clutch X drives the cathead 50 when the nut and hand wheel 55-56 are tightened, and that the cathead 50 is free to rotate on shaft S4 when the nut and hand wheel 55-56 are loosened. It is to be understood that discriminate adjustment of the nut and hand wheel 55-56 can be determinative of drag as and when circumstances require.

Referring now to the two overrunning clutches Y and Z and their combination with the output transmission means C, a common drive element 60 is carried by shaft S4 to journal the overrunning members of the two clutches respectively, it being driven by the transmission C through one clutch Y and separately by manual power applied through the other clutch Z. In practice, the drive element 60 is of right cylinder form and is either part of or is keyed and fixed to the shaft S4 as shown. From FIG. 2 of the drawings it will be seen that separate wedged rollers 61 and 62 are carried in common channels 63 formed into and opening outward at the periphery of element 60. The bottom cam face of the channel converges clockwise with the inner periphery of the overrunning member with which it cooperates, in each case (both Y and Z). In accordance with the invention, the rollers of clutches Y and Z are separated by means of a snap ring 64 carried in a circumferential groove located at the plane of separation between the two overrunning clutch members next to be described.

The overrunning clutch Y involves a drive member 65 of right cylinder form complementary to and rotatably journaled upon one marginal portion of drive element 60 to one side of the above mentioned plane of separation defined by snap ring 64. As shown, the channel 63 is coextensive with said marginal portion and runs out or opens at one end 66 of element 60; the roller 61 being captured endwise by means of a retainer disc 67 disposed between the boss of bearing plate D and the opposed end of said element 60. In accordance with the invention, the wheel 33 of the self-locking or interlocking transmission means C is fixed on and preferably integral with the drive member 65 to rotate the same and/or to anchor the same dependent upon operation of the prime mover or motor E.

The overrunning clutch Z involves a drive member 75 of right cylinder form complementary to and rotatably journaled upon the other marginal portion of drive element 60 to the other side of the above mentioned plane of separation defined by the snap ring 64. As shown, the channel 63 is also coextensive with this marginal portion and runs out or opens at the other end 76 of element 60; the roller 62 being captured endwise by means of a drive flange 77 disposed between the boss of bearing plate D and the opposed end of said element 60. In accordance with the invention, the drive flange 77 is fixed to and preferably integral with the drive member 75 and with a drive tube 78 that revolves coaxially over the shaft S4 and within the surrounding bearing boss of plate D. The drive tube 78 projects beyond the bearing boss and terminates against the shouldered split ring 54, where it is rotatably keyed to a drive hub 79 into which drives a bar or lever 80 is manually inserted to turn the same, with leverage commensurate with the length thereof. The three lever sockets 81 of FIG. 5 are sufficient for all practical purposes and key pins 82 are captured on assembly to assure positive rotation of the drive member 75; a part turn at a time as and when it is necessary to assist operation of the prime mover or motor E.

From the foregoing it will be seen that this boat deck windlass is adapted to be permanently installed insofar as the above deck elements are concerned, while the below deck elements are protected and are readily accessible for servicing and/or replacement. The use of a direct circuit uni-directional electrical motor E is contemplated, in which case the output transmission means C revolves the shaft S4 in a hauling direction only. In the event that electrical power is insufficient or unavailable, the inability of the prime mover or motor can be supplemented or assisted by manual work energy applied through the hub 79 and overrunning clutch Z. It will be observed that line or chain can be hauled freely over the cathead 50 when there is no load to be hauled, and when it is desired to pay out line, or "drop anchor," the clutch X is loosened as required and/or secured by tightening. The self-locking or interlocking transmission remains engaged at all times, and all to the end that a reliable and ready to operate windlass is provided.

Having described only a typical preferred form and application of my invention, I do not wish to be limited or restricted to the specific details herein set forth, but wish to reserve to myself any modifications or variations that may appear to those skilled in the art:

I claim:

1. In combination with a windlass having a live output shaft, a uni-directional transmission means operable to drive said output shaft in a hauling direction of rotation, a line hauling element driveably carried on said output shaft, and prime mover means powering said transmission means; a first overrunning clutch driveably connecting said transmission means and said output shaft to drive the latter in a hauling direction of rotation, a manually operable drive means, and a second overrunning clutch driveably connecting the manually operable drive means and said output shaft also to drive the latter in a hauling direction of rotation, there being a drive element carried on said output shaft and common to and driven by said first and second overrunning clutches, whereby either the prime mover or manually operable drive means can pre-empt the other to drive the output shaft and said hauling element in a hauling direction of rotation.

2. The manually assistable prime mover operated windlass as set forth in claim 1 wherein the first mentioned overrunning clutch has a drive member journaled on said output shaft and affixed to and carrying a self-locking worm driven wheel comprising the output element of said transmission means.

3. The manually assistable prime mover operated windlass as set forth in claim 1 wherein the second mentioned overrunning clutch has a drive member journaled on said output shaft and affixed to and carrying the exposed hub with at least one radially disposed socket for receiving a manually operable lever.

4. The manually assistable prime mover operated windlass as set forth in claim 1 wherein the drive element carried on said output shaft rotatably journals a separate drive member for each of said first and second overrunning clutches.

5. The manually assistable prime mover operated windlass as set forth in claim 1 wherein the drive element carried on said output shaft rotatably journals and has a drive channel coextensive with separate drive members of the said first and second overrunning clutches respectively.

6. The manually assistable prime mover operated windlass as set forth in claim 1 wherein the drive element carried on said output shaft rotatably journals separate drive members of the said first and second overrunning clutches, said drive element having a drive channel opening at its periphery and with a face divergent in the direction of rotation and opposed to the inner diameters of separate drive members of said first and second overrunning clutches respectively, there being separate drive elements disengageably wedged in said channel and at least one within each of said first and second overrunning clutch drive members respectivelly.

7. The manually assistable prime mover operated windlass as set forth in claim 1 wherein the drive element on said output shaft is separated into opposite marginal portions by a circumferential groove and a snap ring carried in said groove, wherein separate drive members of the said first and second overrunning clutches are rotatably journaled on said opposite marginal portions respectively, said drive element having a drive channel opening at its periphery and with a face divergent in the direction of rotation and opposed to the inner diameter of separate drive members of said first and second overrunning clutches respectively, and wherein a drive element is disengageably wedged in said channel and confined to each marginal portion by said snap ring disposed therebetween.

8. In combination with a windlass having a housing, a live output shaft journaled in the housing and projecting therefrom, a uni-directional transmission means operable in said housing to drive said output shaft in a hauling direction of rotation, a line hauling element driveably carried on said projecting output shaft at the exterior of the housing, and prime mover means powering said transmission means; a first overrunning clutch within the housing and driveably connecting said transmission means and said output shaft to drive the latter in a hauling direction of rotation, a manually operable drive means, and a second overrunning clutch within the housing and driveably connecting the manually operable drive means and said output shaft also to drive the latter in a hauling direction of rotation, there being a drive element carried on said output shaft and common to and driven by said first and second overrunning clutches, the housing being closed for the containment of lubricant whereby said first and second overrunning clutches are lubricated and either the prime mover or manually operable drive means can pre-empt the other to drive the output shaft and said hauling element in a hauling direction of rotation.

9. The manually assistable prime mover operated windlass as set forth in claim 8 wherein the first mentioned overrunning clutch has a drive member journaled on said output shaft and affixed to and carrying a self-locking worm driven wheel comprising the output element of said transmission means.

10. The manually assistable prime mover operated windlass as set forth in claim 8 wherein the second mentioned overrunning clutch has a drive member journaled on said output shaft and affixed to and carrying the exposed hub with at least one radially disposed socket for receiving a manually operable lever.

11. The manually assistable prime mover operated windlass as set forth in claim 8 wherein the drive element carried on said output shaft rotatably journals a separate drive member for each of said first and second overrunning clutches.

12. The manually assistable prime mover operated windlass as set forth in claim 8 wherein the drive element carried on said output shaft rotatably journals and has a drive channel coextensive with separate drive members of the said first and second overrunning clutches respectively.

13. The manually assistable prime mover operated windlass as set forth in claim 8 wherein the drive element carried on said output shaft rotatably journals separate drive members of the said first and second overrunning clutches, said drive element having a drive channel opening at its periphery and with a face divergent in the direction of rotation and opposed to the inner diameters of separate drive members of said first and second overrunning clutches respectively, there being separate drive elements disengageably wedged in said channel and at least one within each of said first and second overrunning clutch drive members respectively.

14. The manually assistable prime mover operated windlass as set forth in claim 8 wherein the drive element on said output shaft is separated into opposite marginal portions by a circumferential groove and a snap ring carried in said groove, wherein separate drive members of the said first and second overrunning clutches are rotatably journaled on said opposite marginal portions respectively, said drive element having a drive channel opening at its periphery and with a face divergent in the direction of rotation and opposite to the inner diameter of separate drive members of said first and second overrunning clutches respectively, and wherein a drive element is disengageably wedged in said channel and confined to each marginal portion by said snap ring disposed therebetween.

* * * * *